US005161812A

United States Patent [19]

DeWeese

[11] Patent Number: 5,161,812

[45] Date of Patent: Nov. 10, 1992

[54] TRAVEL-LIFT CHAIR

[76] Inventor: John L. DeWeese, 1484 Paxton Ter., Port Charlotte, Fla. 33952

[21] Appl. No.: 740,938

[22] Filed: Aug. 6, 1991

[51] Int. Cl.[5] ................ B62B 7/04

[52] U.S. Cl. ................ 280/47.38; 280/657; 297/347

[58] Field of Search ................ 297/344, 345, 347, 348, 297/DIG. 4, DIG 10; 280/35, 43.2, 43.23, 47.34, 47.41, 647, 650, 47.38, 657, 250.1; 254/93 R, 102, 124

[56] References Cited

U.S. PATENT DOCUMENTS

| | | | |
|---|---|---|---|
| 290,841 | 12/1883 | Bohsert | 297/348 X |
| 2,041,615 | 5/1936 | Maslowski | 297/347 X |
| 2,982,336 | 5/1961 | Minici | 280/37 X |
| 3,123,400 | 3/1964 | Paulson | 297/347 X |
| 3,882,949 | 5/1975 | Anderson | 280/DIG. 10 X |
| 4,232,901 | 11/1980 | Harrington et al. | 297/DIG. 10 X |
| 4,527,829 | 7/1985 | Fanslau et al. | 297/347 X |
| 4,613,151 | 9/1986 | Kielczewski | 280/650 |
| 4,886,288 | 12/1989 | Dysarz | 280/650 X |
| 4,934,723 | 6/1990 | Dysarz | 280/650 X |
| 5,039,165 | 8/1991 | Rothman et al. | 297/DIG. 10 X |

FOREIGN PATENT DOCUMENTS

| | | | |
|---|---|---|---|
| 073096 | 3/1983 | European Pat. Off. | 297/347 |

*Primary Examiner*—Charles A. Marmor
*Assistant Examiner*—Michael Mar
*Attorney, Agent, or Firm*—Frank A. Lukasik

[57] ABSTRACT

The invention is an improved wheel chair in which the seat may be raised or lowered by a hand powered hydraulic ram mechanical means to levels that match the surface of the chair or bed to which the patient is being transferred. A commode function is also provided. The chair comprises a base having swivel casters and fixed wheels, an upper unit having a seat and backrest and a hydraulic pump, and a seat raising mechanism consisting of four pairs of interconnected levers connected by two cross bars in such a way that when the bars are pushed apart by a hydraulic ram, the separating motion is amplified to give the desired range of chair seat travel height.

5 Claims, 4 Drawing Sheets

TRAVEL-LIFT CHAIR

BACKGROUND OF THE INVENTION

1. Field of the invention

This invention relates generally to a wheel chair for a disabled person and more particularly for a specialized chair for assistance in movement, transport, and care of personal functions of a handicapped person.

2. Discussion of the prior art

Current and prior art wheelchair designs available are singular in purpose and primarily allow movement of an individual from place to place. If the individual is capable, he may propel himself, or the chair may be equipped with a propulsion motor. There are other types of chairs called commode or potty chairs for relief of personal body functions.

U.S. Pat. No. 3,882,949 to Anderson discloses a lifting wheel chair of a type which has a powered elevating mechanism capable of raising the seat and occupant from a height of 6" to 26" above ground. An actuator unit is powered by a motor utilizing a recirculating ball screw and nut to convert the gear motor's rotary output into linear thrust. The device is capable of climbing a 12" high curb and may be used while driving any standard-sized two door sedan. U.S. Pat. No. 4,555,121 to Lockard et al discloses a lifting chair which has the ability to be detached from the wheeled base. The platform is pivotally connected with the vertical supports and supported by an angular adjustment assembly. The angular assembly includes a selectively extendable gas cylinder.

U.S. Pat. No. 4,613,151 to Kielczewski discloses a high-low extension lift power wheel chair which includes an adjustable parallelogram structure. A link is provided to connect the parallelogram linkage with an extension frame. A threaded shaft is rotatably secured to the main frame by bearings. A motor is employed to rotate a gear and an idler gear.

U.S. Pat. No. 4,886,288 to Dysarz discloses a wheel chair that is normally used to transport persons that are unable to walk, to a height relative to a standing person. Elevation is accomplished by the use of hydraulic or pneumatic pressure reacting on the two or four cylinders that form the four legs of the elevating wheel chair. As air or fluid is forced into the cylinders, the pistons push the rods onto the floor and further cause the chair to elevate.

U.S. Pat. No. 4,934,723 to Dysarz discloses a second embodiment of the chair disclosed in the 3,288" patent. In this patent, the feet of the wheelchair are first rotated outward and lowered onto the floor, the wheelchair is then elevated by air pressure to a desired height and locked off for safety. To elevate the chair, the right arm rest is pulled up and pushed down, causing it to rotated about the hinge. As the arm rest moves up and down, it causes the pump rod to move in and out of the pump thus building up air pressure to be pumped into the cylinders to raise the legs.

Depending on the degree of handicap, and in the case of a paraplegic's upper body strength, these prior art chairs are proven to be useful. However, transfer from these chairs to other chairs and/or bed, can be difficult. For those requiring assistance, they must usually be lifted from place to place. If the chair and the chair or bed being transferred to are of similar heights, a slide board may be used to eliminate or minimize the heavy lifting. Unfortunately, sliding in this fashion is often hindered, since in many cases the support surfaces of chairs and beds are not the same height from the floor or the same height as the wheelchair seat.

Transfer by sliding is also compromised by the wheels of the chair which presents an obstacle, since it extends into the seat profile area. Another problem with the prior art chair is that it is often too wide to go through the narrow doors that have commonly been provided for in older homes, the bathrooms of some newer homes, motels, and hotels, and in mobile manufactured homes. The standard chair is often too large for use in rooms or areas of restricted size, such as in campers, RV's and doctor's and dentist's examining rooms. There is the ever present risk of dropping and injury to the patient and physical over stress and injury to the caretaker during transfer of the patient from the wheelchair to another place.

SUMMARY OF THE INVENTION

A wheel chair is provided in which the seat may be raised or lowered by a hand powered hydraulic or mechanical means to levels that match the surface of the chair or bed to which the patient is being transferred.

The patient may then either transfer him or herself to the other chair or bed without, or if necessary, with assistance by sliding. Risk of falling or over stressing is minimized. A commode function is also provided. The chair may be placed next to a bed at night and adjusted to the height of the bed. If the patient is capable, he or she may then transfer to the chair and then back to the bed without the necessity of waking the caretaker.

The chair will pass through a 20" wide door and is small enough to be used in vans, camping trailers, and where bathroom doors are narrow. It is also designed to feel solid and secure to the patient, and is relatively light, for easy lifting and stowage by the caretaker when traveling. The chair is not generally intended for use by the patient without the presence of an attendant or caretaker, except when it is being used solely for the commode function and the patient has sufficient body strength to slide himself. To use the chair as a commode, the chair is placed securely next to the bed or chair that the patient is occupying, brakes secured, and the seat cushion removed, thus exposing the commode pan. The patient then slides onto the chair.

The chair is designed to present an aesthetically pleasing appearance that will blend in with other furniture.

Accordingly, it is a principal object of the present invention to provide a new and improved wheelchair with variable seat height that locks in any position allowing compatibility with any height surface.

It is another object of the present invention to provide a wheelchair having no obstacles or protuberances to inhibit transferring into or out of the wheelchair.

It is still another object of the invention to provide a specialized chair for assistance in movement, transport, and care of personal body functions of a handicapped person.

Still another object of the invention is to provide a wheelchair that provides space to allow a commode function.

Yet another object of the invention is to provide a wheelchair that is arranged by design of the components to be used in a minimum of space.

These and other objects will become more clear upon a consideration of the following description of a preferred embodiment.

DESCRIPTION OF THE PREFERRED EMBODIMENT

Figure 1:
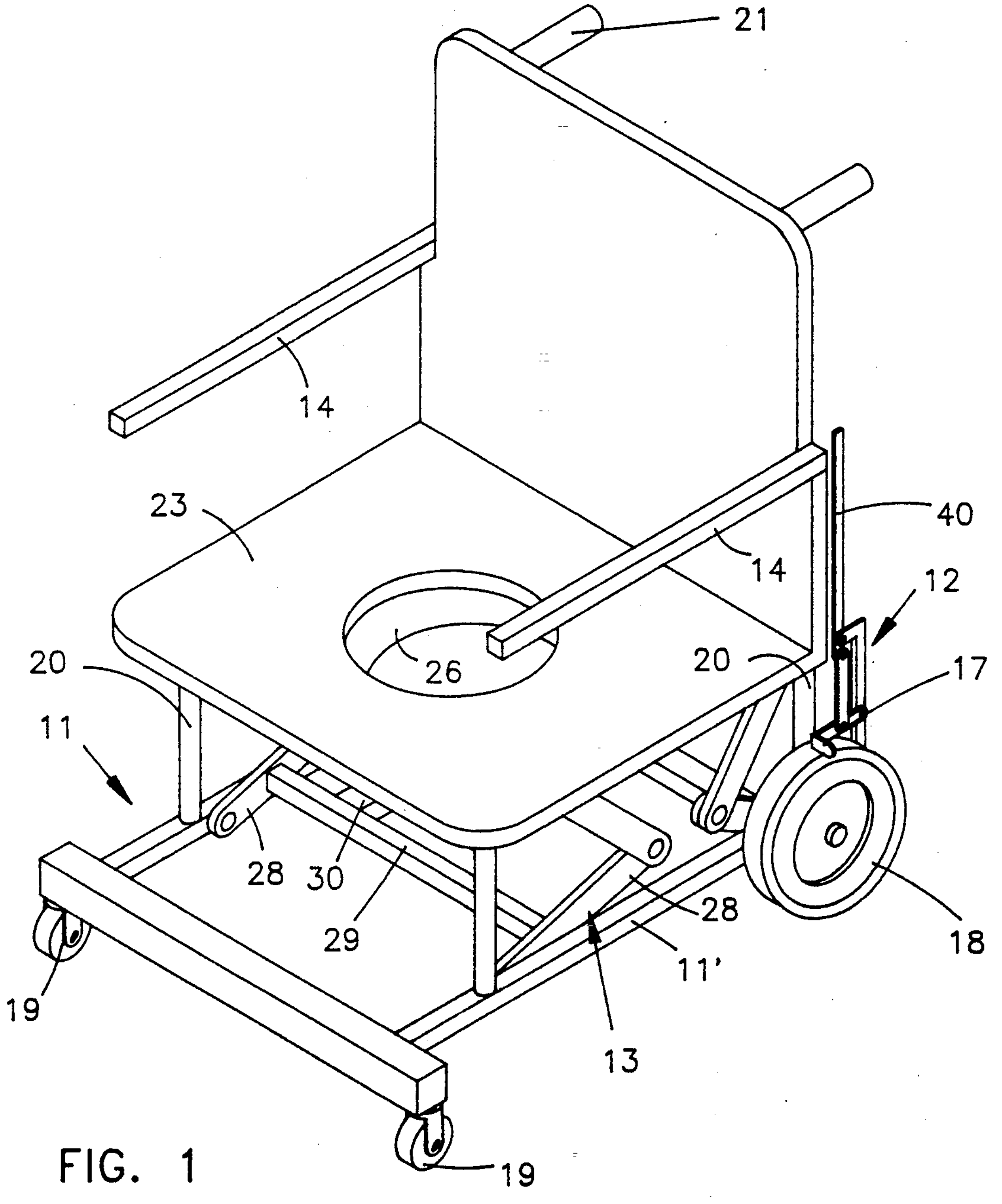
FIG. 1 is a perspective view of the travel-lift chair in accordance with the present invention at normal height.
Figure 2:
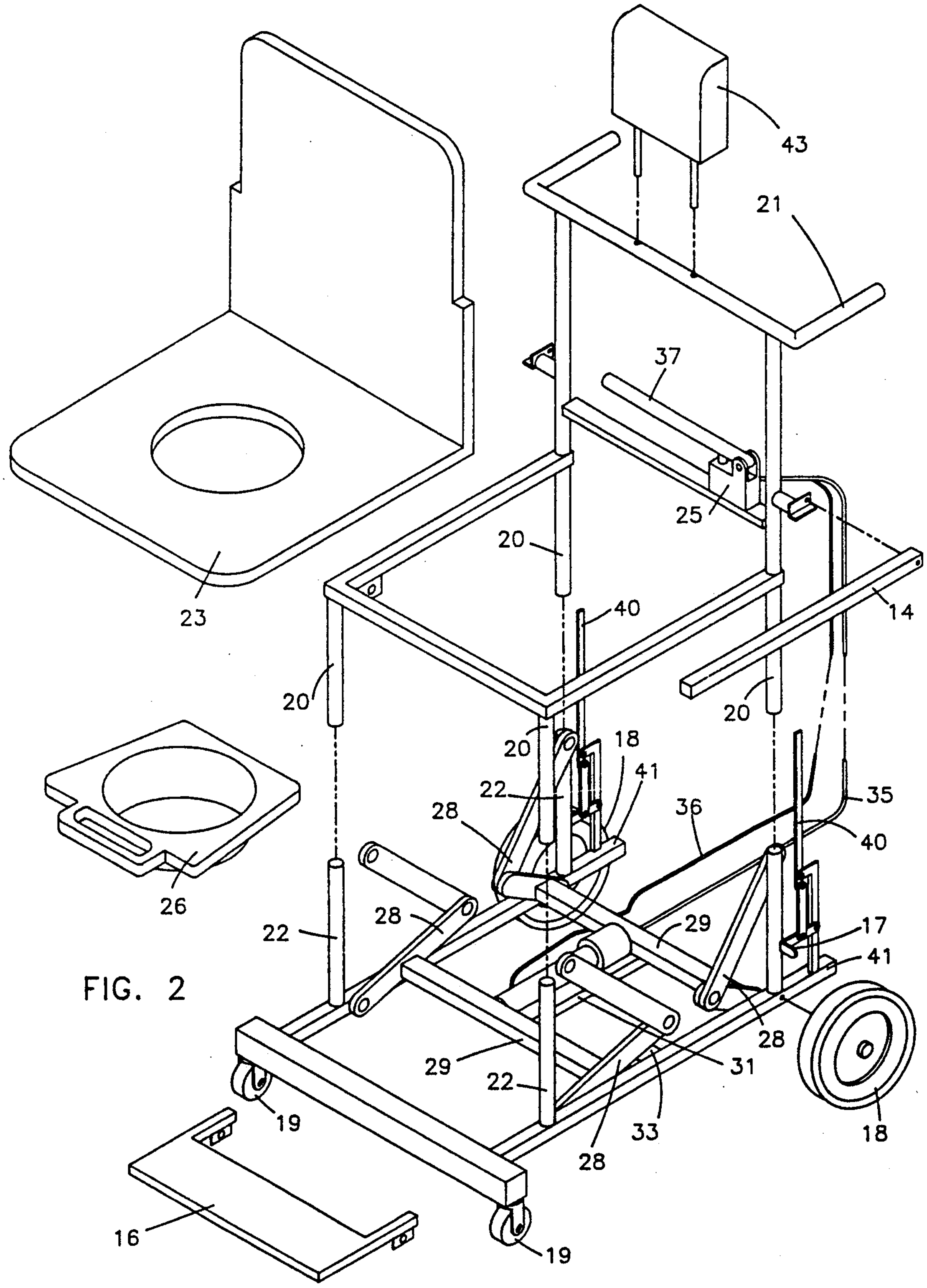
FIG. 2 is an exploded perspective view of the travel-lift chair in accordance with the present invention.
Figure 4:
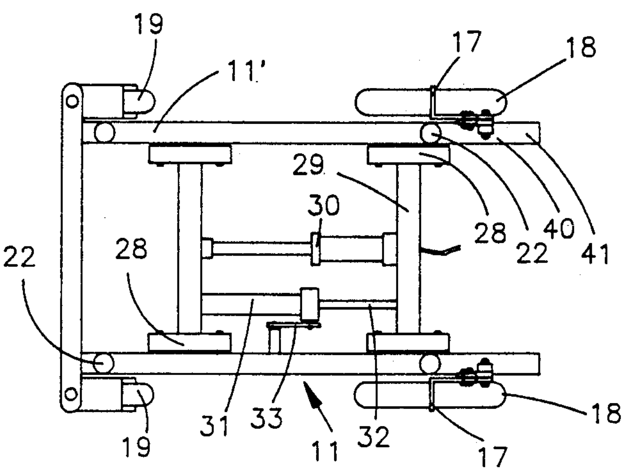
FIG. 4 is a top view of the base and seat raising mechanism of the present invention.
Figure 3:
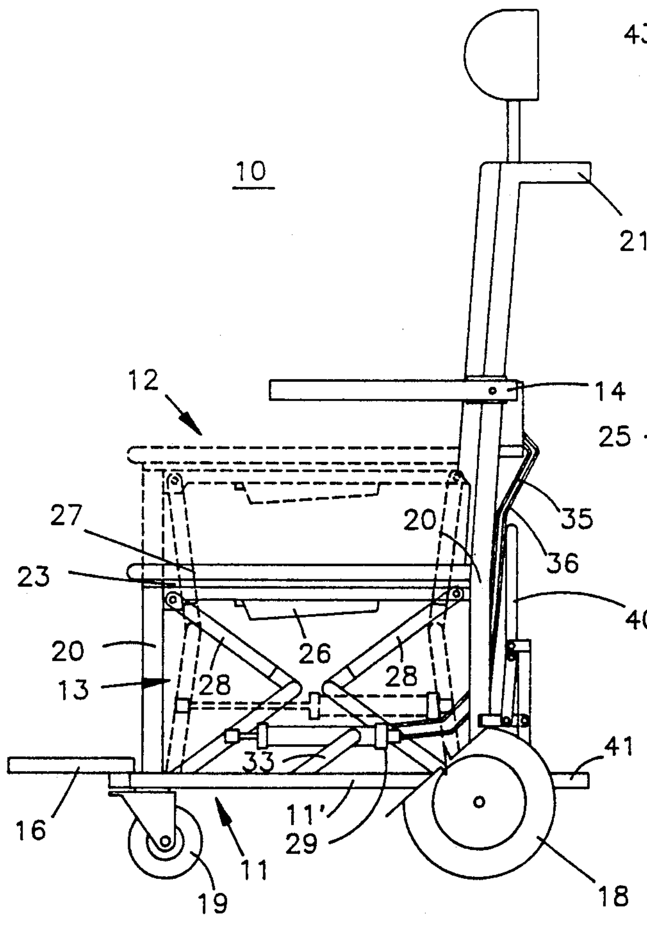
FIG. 3 is a side view of the travel-lift chair of the present invention.
Figure 5:
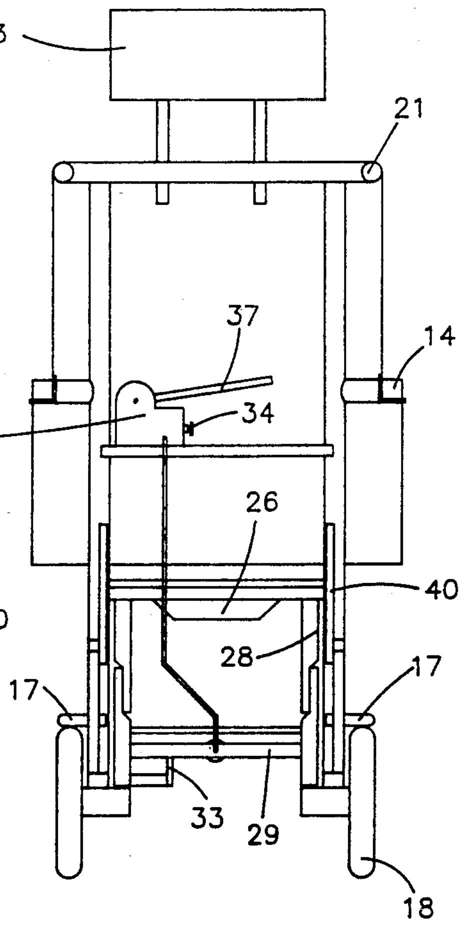
FIG. 5 is a rear view of the travel-lift chair of the present invention.

The wheelchair 10 of the present invention is shown in FIG. 1 in its lowered position. The wheelchair 10 comprises a base 11 and an upper unit 12 interconnected by the seat raising mechanism 13. Swing-up chair arms 14 and optional headrest 15 and footrest 16 are also provided. Hand brakes 17 secure the chair 10 when it is not being moved. The base 11 includes a lower frame 11' which has two fixed wheels 18 at the rear (the pushing end), and two swivel caster wheels 19 at the front end 11''. As shown in FIGS. 2-5, four tubes 22 are affixed to, and extend upward from the lower frame 11' to provide location and guidance for the upper unit 12 to slide up and down. The upper unit 12 is equipped with four tubes 20 which telescope over the tubes 22, providing alignment between the base 11 and the upper unit 12 to slide up and down. The upper unit 12 also comprises seat and chair back 23, push handles and grips 21, fold-up chair arms 24 and mounting for the hydraulic hand pump 25. The seat and chair back 23 may be equipped with a removable commode pan 26. A removable padded seat cushion 27 covers the commode 26 when it is unneeded.

Two brake units 17, one for each rear wheel 18 are provided and are easily accessible to the caretaker at the back of the chair 10. Extensions 41 are provided at the rear of lower frame 11' of the chair 10 to assist the caretaker in moving the chair 10 over small obstacles by use of foot leverage. The rearward extensions 41 are sized lengthwise so that the ends of the push handles 21 and extensions 41 are in the same plane in order to provide chair 10 support against a wall if so desired and also for chair storage on its back.

The seat raising mechanism 13 connects the base 11 and the upper unit 12 together via a multiplicity of hinge pins. The seat raising mechanism 13 comprises four pairs of interconnected levers 28. Two pairs of levers 28 are on opposite sides of the chair 10. The levers 28 are connected by two cross bars 29 in such a way that when the bars 29 are pushed apart by a hydraulic ram 30, the separating motion is amplified to give the desired range of chair seat 23 travel height. The levers 28 being spaced apart on opposite sides of the chair 10 also provide a space for the commode pan 26 and contribute to chair seat stability.

A stabilizing mechanism comprising two telescoping tubes 31-32, each fastened to a cross bar 29 and having a link bar 33 connecting the outer tube 31 to the chair base 11 lower frame 11' to insure load equalization on the lift linkages or levers 28 and seat stabilization.

A hydraulic hand pump 25 mounted on upper unit 12 provides the hydraulic pressure to actuate the hydraulic ram 30, thus raising the seat 23 level. A pressure relief valve 34, integral to the hand pump 25 is opened to lower the chair seat 23 slowly in a smooth controlled manner. The pump 25 is mounted on the back of frame 42 of upper unit 12 at a comfortable height for use by the caretaker. The pump 25 is connected through two lines 35-36 to the hydraulic ram 30. A first line 35, consisting of solid and flexible tubing, carries high pressure hydraulic fluid to the ram 30 when the pump handle 37 is actuated with the relief valve 34 closed, raising the seat 23 as shown in dotted lines in FIG. 3. When the valve 34 is opened, the fluid returns to the pump reservoir, allowing the seat 23 to lower under the weight of the patient or by hand pressure on the seat 23. The other line 36, comprising flexible tubing, returns fluid that leaks past the ram piston seal to the pump 25 hydraulic reservoir, thus preventing possible hydraulic lock-up of the ram 30 and loss of hydraulic fluid.

Figure 6:
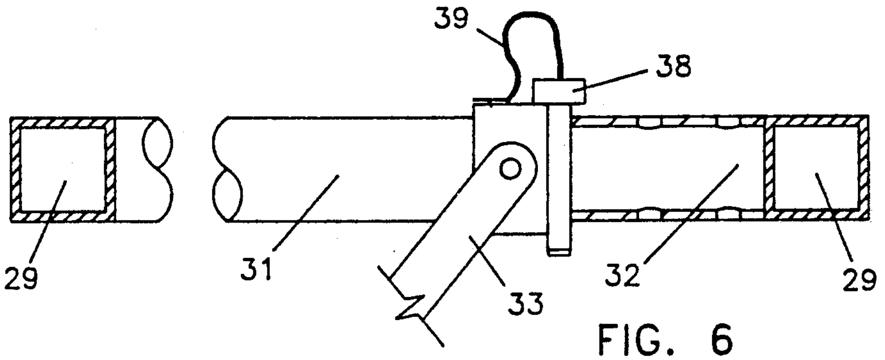
FIG. 6 is a side view of a down safety stop limit of the present invention.

As shown in FIG. 6, safety pin 38, secured to tube 31 may be inserted into tube 32 to prevent the upper unit 12 from lowering in the event of hydraulic fluid piston bypass leakage in the ram 30, below the desired set point. Pin 38 is fastened to tube 31 by wire cable 39.

Figure 7:
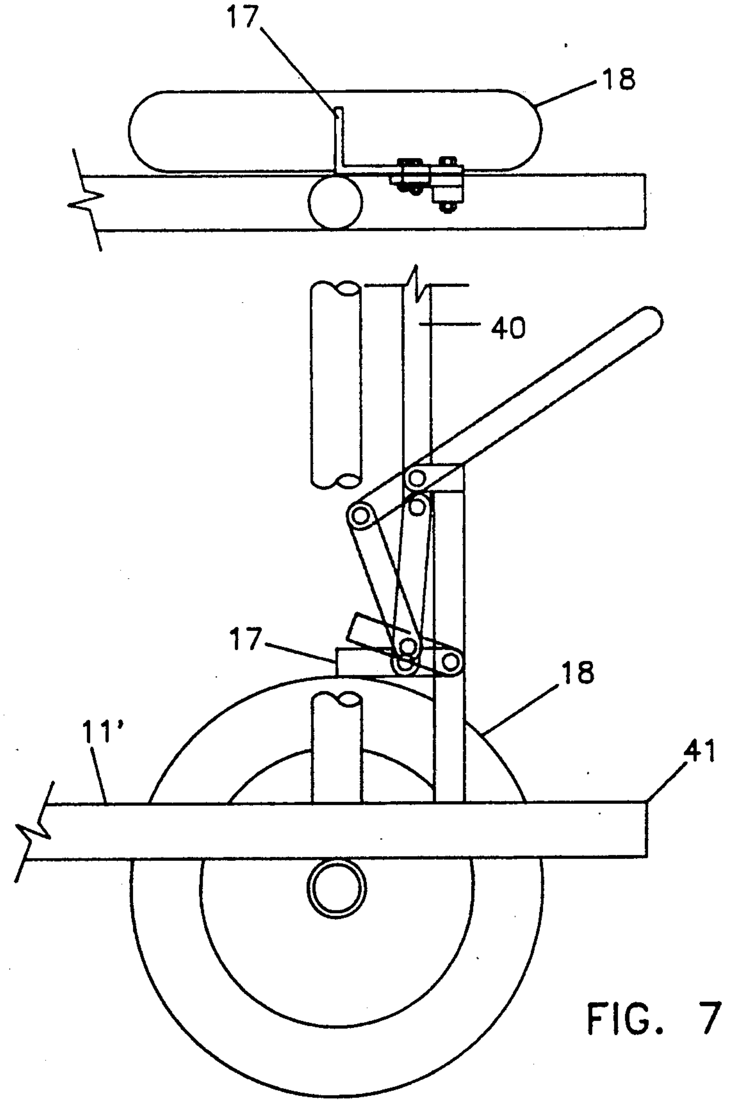
FIG. 7 is a side view, partially in section, of a wheel brake of the present invention.

As shown in FIG. 7, brakes 17 are provided for each rear wheel 18. Brake actuation levers 40 are located for easy access by the caretaker at the rear of the chair 10.

A headrest 43 and footrest 16 may also be provided for additional comfort and convenience of the disabled person.

Although the system described in detail above has been found to be most satisfactory and preferred, many variations in mechanics, structure and method are possible. For example, steel, aluminum or plastic may be used for the frame structure. The seat and chair back 23 may be molded to form a more comfortable support for the disabled person. A mechanical device such as a screw jack and appropriate actuation may be substituted for the hydraulic ram 30 or the pump 25.

Although manual brakes are shown for example, automatic brakes are also considered as part of the invention. For those caretakers or disabled persons who are capable of operating a release mechanism for the automatic brake, the automatic brake would provide an additional safety factor.

The above are exemplary of the possible changes or variations because many varying and different embodiments made within the scope of the inventive concept herein taught and because many modifications may be made in the embodiments herein detailed in accordance with the descriptive requirements of law, it should be understood that the details herein are to be interpreted as illustrative and not in a limiting sense.

What is claimed is:

1. A wheel chair for assistance in movement, transport, and care of personal functions of a handicapped person comprising:

(1) lower frame means having;

front swivel caster wheels, rear fixed wheels, and four upwardly extending tubes, (2) an upper unit comprising:

a seat and backrest frame, a seat and backrest affixed to said frame, a commode, slideably mounted under said seat, pump means affixed to said frame, and four downwardly extending tubes affixed to said frame and slideably engageable with said upwardly extending tubes, (3) seat raising means connecting said lower frame means and said upper unit, said seat raising means having ;

four pairs of interconnected levers pivotally connected to said lower frame means and said upper unit, cross bars affixed to and separating two pairs of said interconnected levers, a hydraulic ram affixed between said cross bars for exerting pressure in opposing directions and for amplifying the separating motion of said interconnected levers and raising said seat in a vertical direction, a stabilizing mechanism comprising two telescoping tubes connected to said cross bars, parallel to said hydraulic ram and having a link bar connected to said frame means for providing load equalization, a pin releasably secured to one of the telescoping tubes for locking said upper unit in a raised position relative to said lower frame means and (4) tube means connecting said pump means and said hydraulic ram for supplying operating pressure to raise or lower said seat.

2. A wheel chair in accordance with claim 1 wherein said wheel means comprises a pair of swivel casters and a pair of fixed wheels each having a manually operated hand brake.

3. A wheel chair in accordance with claim 1 wherein said upper unit comprises, fold-up chair arms, and push handles and grips.

4. A wheel chair in accordance with claim 1 wherein said lower frame comprises foot-leverage extensions.

5. A wheel chair for assistance in movement, transport, and care of personal functions of a handicapped person comprising:

lower frame means having a pair of swivel casters and a pair of fixed wheels each having a manually operated hand brake, four upwardly extending tubes, and foot lever extensions, an upper unit having; a seat and backrest frame, a padded seat and back rest affixed to said frame, a commode, slideably mounted under said seat, pump means affixed to said frame, four downwardly extending tubes affixed to said frame and slideably engageable with said upwardly extending tubes, fold-up chair arms, and push handles and grips, seat raising means connecting said lower frame means and said upper unit, said seat raising means having; four pairs of interconnected levers pivotally connected to said lower frame means and said upper unit, cross bars affixed to and separating two pairs of said interconnected levers, a hydraulic ram affixed between said cross bars for exerting pressure in opposing directions and for amplifying the separating motion of said cross bars and extending said interconnected levers and raising said seat in a vertical direction, a stabilizing mechanism comprising two telescoping tues connected to said cross bars, parallel to said hydraulic ram and having a link bar connected to said frame means for providing load equalization, a pin releasably secured to one of the telescoping tubes for locking said upper unit in a raised position relative to said lower frame means and flexible hydraulic tubing connecting said pump means and said hydraulic ram for supplying operating pressure to raise or lower said seat.

* * * * *